United States Patent
Hunter et al.

(10) Patent No.: US 6,343,289 B1
(45) Date of Patent: Jan. 29, 2002

(54) EFFICIENT SEARCH AND ORGANIZATION OF A FORWARDING DATABASE OR THE LIKE

(75) Inventors: Van A. Hunter, San Jose; Milan Momirov, San Francisco, both of CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/118,671

(22) Filed: Jul. 17, 1998

Related U.S. Application Data

(60) Provisional application No. 60/063,785, filed on Oct. 31, 1997, provisional application No. 60/063,814, filed on Oct. 31, 1997, provisional application No. 60/063,813, filed on Oct. 31, 1997, and provisional application No. 60/063,947, filed on Oct. 31, 1997.

(51) Int. Cl.[7] ............................................. G06F 17/30
(52) U.S. Cl. .............................. 707/10; 707/3; 709/216; 711/140; 711/216
(58) Field of Search .............................. 707/10, 3, 201, 707/1; 370/217, 218, 227, 230, 255, 256, 400, 401, 393; 709/200, 216, 226, 238, 228; 712/34, 219; 713/151; 711/216, 137, 138, 139, 140

(56) References Cited

U.S. PATENT DOCUMENTS

| | | | | |
|---|---|---|---|---|
| 5,521,910 A | * | 5/1996 | Mathews | 370/256 |
| 5,757,924 A | * | 5/1998 | Friedman et al. | 713/151 |
| 5,848,257 A | * | 12/1998 | Angle et al. | 712/219 |
| 5,996,021 A | * | 11/1999 | Civanlar et al. | 709/238 |
| 6,006,264 A | * | 12/1999 | Colby et al. | 709/226 |
| 6,157,955 A | * | 12/2000 | Narad et al. | 709/228 |
| 6,173,384 B1 | * | 1/2001 | Weaver | 711/216 |

OTHER PUBLICATIONS

"Fast address lookups uing controlled prefix expansion" by V. Srinivasan et al., Washington University, St. Louis, ACM Transaction on Computer Systems, vol. 17, No. 1, pp. 1–40, (Feb. 1999).*

"Forwarding engine for fast routing lookups and updates" by Daxiao YU et all., Dept. of Elect. Engin., San Jose State Univ., CA, (High Speed Networks), Global Tel. Confer., pp. 1556–1564 (1999).*

* cited by examiner

*Primary Examiner*—Diane Mizrahi
(74) *Attorney, Agent, or Firm*—Blakely, Sokoloff, Taylor & Zafman LLP

(57) ABSTRACT

A method and apparatus for efficiently searching a forwarding database or similar data structure are provided. According to one aspect of the present invention, the overall average time required to forward a packet from the ingress port of a network device to one or more egress ports may be reduced by attacking the worst case forwarding database search. Data is received at a first port of the network device and a search key is extracted from the data. Typically the search key includes one or more of a source or destination Internet Protocol (IP) address, a souce or destination Media Access Control (MAC) address, and/or a Virtual Local Area Network (VLAN) tag. Ultimately, the data is forwarded to a second port of the network device based upon a matching entry located by the search. The search includes retrieving keys from entries of the forwarding database and comparing the search key to the keys until a matching entry is located. The retrieval includes causing a pipelined memory in which the forwarding database is stored to access memory locations in an order that minimizes a worst case search of the forwarding database. For example, a request is made to load a first key from memory that is associated with a database entry and subsequent requests may be made in a pipelined manner to load subsequent keys, whereby the memory is caused to access keys of different entries during consecutive clock cycles.

10 Claims, 6 Drawing Sheets

EFFICIENT SEARCH AND ORGANIZATION OF A FORWARDING DATABASE OR THE LIKE

This application claims the benefit of U.S. Provisional Application No. 60/063,785, U.S. Provisional Application No. 60/063,814, U.S. Provisional Application No. 60/063,813, and U.S. Provisional Application No. 60/063,947 all filed Oct. 31, 1997.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking devices and database search optimization. More particularly, the invention relates to a method and apparatus for efficiently searching a forwarding database or similar data structure.

2. Description of the Related Art

A network device's performance is based on how quickly it can forward a packet. Before a network device, such as a bridge, a router, or a Layer 2 or Layer 3 switch, can forward a packet, typically, it must locate an entry in its forwarding database corresponding to a search key specified in the packet. As a result, the organization and searching mechanism of the forwarding database are critical to making a high-performance network device. As used herein, the term "forwarding database" is meant to refer broadly to any type of data structure for organizing data that is used in connection with forwarding packets (e.g., routing/bridging) from an ingress port of a network device to one or more egress ports of the network device.

Referring to FIG. 1, a prior forwarding database organization and search approach are briefly described. Forwarding database entries 110 are stored as part of a hash table 100. In this example, each entry includes four double words ("d-words"), e.g., four 32-bit words, w1 through w4. The entries also include a pointer to the next entry in the bin or a null pointer if the entry happens to be the last one in the bin. One or more of the four d-words may be used to store a key associated with the forwarding database entry and the remainder of the d-words contain data to facilitate forwarding.

An entry is associated with a bin in the hash table 100 based upon the hashing scheme employed and the key that is associated with the particular entry. A physical hash collision occurs when more than one entry to hashes to the same bin. Because the worst case for a forwarding database search is a search for an entry that turns out to be the last in a bin having many entries, much time has been spent worrying about how to avoid physical hash collisions. A typical scheme used to avoid such collisions involves the use of a hash table that includes more bins than the number of forwarding database entries. That is, the hash table has an index space that is greater than the number of entries that are expected to be stored in the table. In this manner, the probability that more than one forwarding database entry will reside in a given bin is decreased.

Supposedly having solved the problem associated with searching large bins by reducing the occurrence of physical hash collisions, this prior search approach optimistically assumes that the current entry being examined is, in fact, the matching entry. Consistent with this assumption, after having issued a request for the key associated with the first entry in the bin, the next memory access request is for data associated with the first entry. In this example, the memory accesses are labeled 1 through 6. The first memory access 1 represents a request from memory for the first word, w1, of the first entry 111. The typical memory access time is two or three clocks, depending upon the type of memory employed. Thus, the first word of data, w1, will be available two or three clocks from the time the request is made. However, this delay does not mean the search algorithm is idle during the lag between the request for data and its subsequent availability. Rather, taking advantage of the pipelined nature of modem memories, search schemes typically issue memory access requests on each clock until a match is located or the end of the bin is reached. Again, due to the optimistic nature of the prior search approach, the next memory access 2 is for the next d-word, w2, of the first entry 111. The search continues to request data from the first entry 11, e.g., memory access request 3 and 4, until the entry's key has been compared to the search key and it has been determined whether or not the first entry 111 is the desired forwarding database entry. If the first entry 111 is not the desired entry, then a memory pipeline delay is incurred while the pointer for the next entry 112 is requested by memory access 5.

While producing excellent best case performance, i.e., when the first entry is the desired entry, one disadvantage of this prior approach is that the worst case search is very expensive in terms of clock cycles. Each time this optimistic search approach encounters a forwarding database entry that is not the one desired, a memory pipeline delay is incurred as the search algorithm resets its pointers and loads the key from the next forwarding database entry. In general, the prior search approach illustrated seeks to optimize the best case. However, as a result of this short-sighted approach, the worst case search is actually made worse. Therefore, excellent best case performance is achieved by sacrificing the overall average search time.

In light of the foregoing, what is needed is a more thoughtful search approach that will reduce the overall average search time.

BRIEF SUMMARY OF THE INVENTION

A method and apparatus for efficiently searching a forwarding database or similar data structure are described. According to one aspect of the present invention, a request is made to load a first key from memory that is associated with a database entry. In a pipelined manner, a subsequent request is made to load a next key from memory that is associated with a next database entry. The load requests include outputting an address to the memory that corresponds to a location in memory storing the desired key. In any event, after receipt of the requested data from memory, it is determined whether the associated database entry is a matching entry by comparing the data to a search key. This process of loading subsequent keys is repeated until a predetermined condition is met. Advantageously, this search approach limits the search time required for the worst case scenario by assuming the comparison between the current forwarding database entry key and the search key will not result in a match and thereby reduces the overall average search time.

According to another aspect of the present invention, a network device may forward data more efficiently. Data is received at a first port of the network device and a search key is extracted from the data. A forwarding database is then searched for an entry that corresponds to the search key. Ultimately, the data is forwarded to a second port of the network device based upon a matching entry located by the search. The search includes retrieving keys from entries of the forwarding database and comparing the search key to the keys until a matching entry is located. The retrieval includes causing a pipelined memory in which the forwarding database is stored to access memory locations in an order that minimizes a worst case search of the forwarding database.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for efficiently searching a forwarding database or similar data structure are described. Using the teachings of the present invention, the overall average time required to forward a packet from a network device's ingress port to one or more egress ports may be reduced by attacking the worst case forwarding database search. The worst case forwarding database search occurs when the desired forwarding database entry is the last entry in a bin with many other entries. Rather than assuming the first entry in a hash table bin will be the desired entry simply because steps have been taken to avoid hash collisions, according an embodiment of the present invention, the assumption is actually the opposite. The novel forwarding database search approach limits the search time required for the worst case scenario by assuming the comparison between the current forwarding database entry key and the search key will not result in a match. Additionally, an intelligent entry organization may be employed to facilitate search processing. Together, the entry organization and the pipelined nature of the forwarding database memory are used to quickly request and examine the forwarding database keys to locate a match before unnecessarily requesting the retrieval of additional information from any forwarding database entries. Conceptually, the novel search approach skips over the top of the forwarding database entries, associated with a particular hash bin, extracting the key from each one. Then, when a matching key is located, retrieval of the data associated with the matching entry can begin. Advantageously, in this manner, search times for scenarios that are handled poorly by prior search approaches, including the worst case scenario, are improved, thereby reducing the overall average search time.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software. Importantly, while embodiments of the present invention will be described with reference to an Ethernet switch, the method and apparatus described herein are equally applicable to other types of network devices, such as routers, bridges, and the like.

An Exemplary Switching Device Architecture

Figure 2:
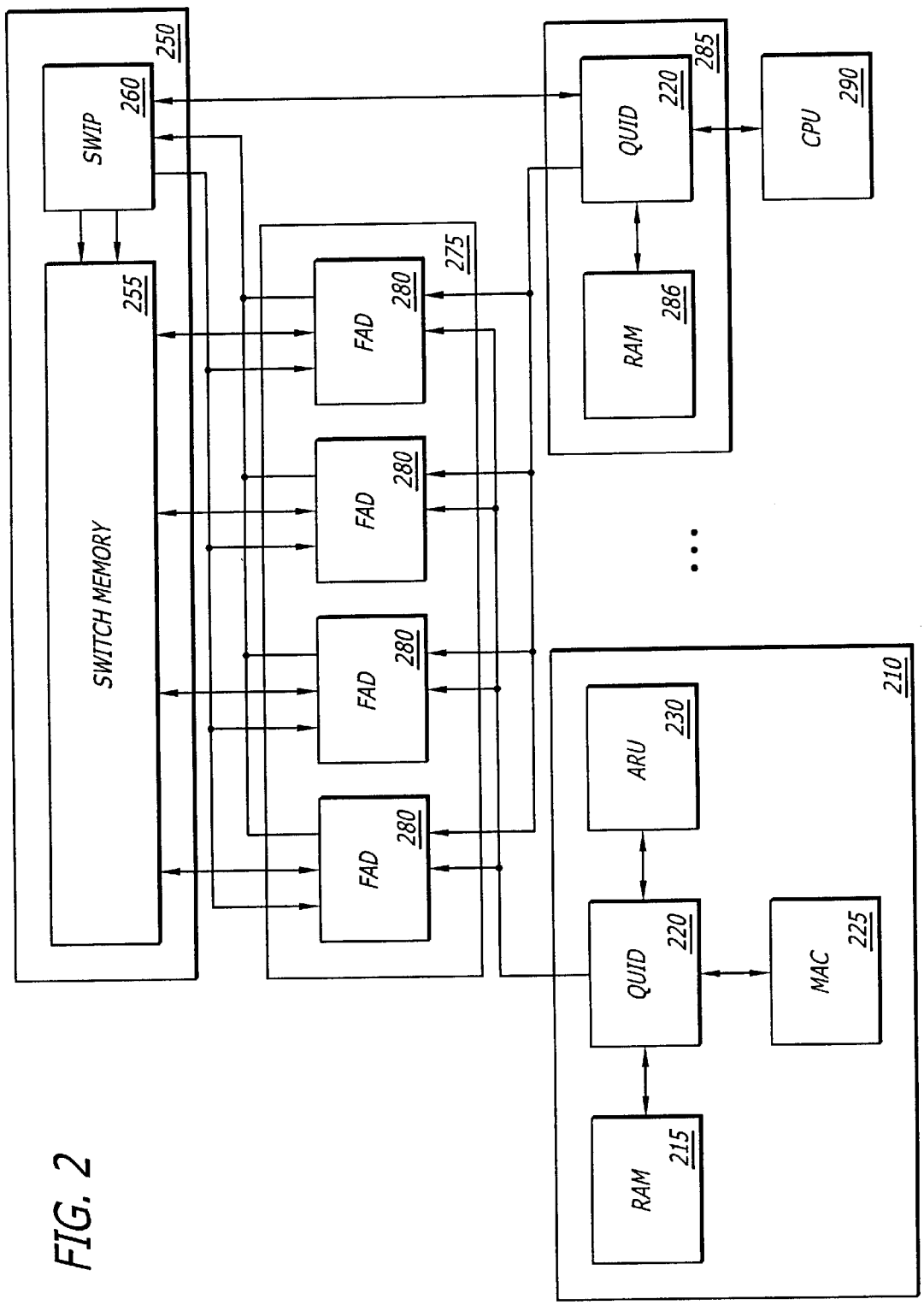
FIG. 2 is a block diagram of an exemplary packet forwarding device in which various embodiments of present invention may be implemented.

An overview of the architecture of a network device, e.g., switching device 200, in which an embodiment of the present invention may be implemented is illustrated by FIG. 2. According to the embodiment depicted, switching device 200 is an output buffered, shared memory switch. Switching device 200 includes a plurality of input/output (I/O) interfaces 210 coupled in communication with a switch core. The switch core comprises a switch fabric 250 and a fabric interface 275. Also coupled to the switch core via interface 285 is a central processing unit (CPU) 290 which may facilitate management of forwarding and filtering databases of the I/O interfaces 210.

Data, typically in the form of variable-length packets, enters the switching device 200 via one of the plurality of I/O interfaces 210. The inbound packet data is provided by the I/10 interface 210 to the fabric interface 275 which steers the data through the switch fabric 250. When the packet data exits the switch fabric 250 it passes again through fabric interface 275 and ultimately to one or more I/O interfaces 210 from which the packet data is to be transmitted. The I/O interfaces 210 are coupled to the switch core though a bus interface 235 (also referred to as a "switch tap", a "tap bus," or simply a "tap"). The switch tap 235 moves packet data between the fabric interface 275 and the I/O interface 210. While for convenience, only one I/O interface 210 has been depicted, it should be appreciated the tap bus 235 may comprise a plurality of point-to-point buses coupling each I/O interface 210 to the fabric interface 275. The fabric interface 275 may be thought of conceptually as a large multiplexer (MUX)/demultiplexer (demux) with storage. The fabric interface 275 muxes the tap buses 235 into a bus 276 coupled to the switch fabric 250. Forwarding control bits from the packet data are also presented by the fabric interface 275 to the switch fabric 250 to facilitate cell queuing.

The switch fabric 250 includes a switch memory 255 and a switch processor (SWIP) 260. The SWIP 260 logically organizes the packet data read into the switch memory 255 by associating the packet data with one of a plurality of output queues. Additionally, the SWIP 260 controls the flow of data between the fabric interface 275 and the switch memory 255 and the flow of data between the fabric interface 275 and the I/O interfaces 210.

Referring again to the I/O interfaces 210, each may include one or more Port Interface Devices (PIDs), such as a Quad-port Interface Device (QUID) 220. The I/O interfaces 210 may each additionally include one or more Media Access Controllers (MACs) 225, Address Resolution Units (ARUs) 230, and memories 215. In one embodiment, one or more of the MACs 225 comprise 84C301 Seeq Quad 10/100 MAC devices which may support up to four 10/100 Megabit per second (Mbps) ports (not shown). While, for the sake of explanation, (CSMA/CD) is assumed to be the medium access method employed by the MACs 225, in alternative embodiments, the MACs 225 may operate according to other communication protocols, such as the well-known Fiber Distributed Data Interface (FDDI) or Asynchronous Transfer Mode (ATM) communication protocols.

In the present embodiment, packets are forwarded among QUIDs 220 through the switch core in the form of fixed-length cells. The QUID 220 fragments inbound packets (i.e., those received from the MAC 225) prior to providing them to the fabric interface 275 and performs reassembly upon outbound cells (i.e., those received from the fabric interface 275). As packets are read from the MAC 225, forwarding control information necessary for steering the packet through the switch fabric 250 to the QUID 220 at which the packet will exit (e.g., the egress PID) may be prepended and/or appended to packets and/or the associated fixed-length cells by the ingress PID (e.g., the QUID 220 upon which a particular packet is received).

Packet header matching, Layer 2 based learning, Layer 2 and Layer 3 packet forwarding, filtering, and aging are exemplary functions that may be performed by the ARU 230. Each of these functions typically require a search to be made of the forwarding database. According to one embodiment of the present invention, an improved organization and search of the forwarding database is employed. In this manner, these critical functions, are accelerated thereby enhancing the overall performance of the network device. The improved organization and search of the forwarding database and exemplary functional units for implementing the search will be described further below.

The ingress PID interfaces with its associated ARU 230 to acquire forwarding control information associated with a packet. As the QUID 220 performs packet fragmentation, an address look-up request, which contains the destination Network layer address to which the packet is addressed (e.g., the destination Internet Protocol (IP) address), may be sent to the ARU 230. Upon completion of the address look-up, the ARU 230 returns the forwarding control information associated with the packet. Typically, the ARU 230 processes address look-up requests in the order received. The ARU processing may include performing Layer 2, e.g., Media Access Control (MAC) layer, or Layer 3, e.g., Network layer, address look-up to determine the forwarding control information such as, a destination address. To support Classless Inter-Domain Routing (CIDR) and Variable Length Subnet Masks (VLSM), the ARU 230 may perform routing using the improved longest match search described in copending patent application Ser. No. 09/107,039, and now U.S. Pat. No. 6,223,172 entitled "Longest Best Match Search" and assigned to the assignee of the present invention.

According to the embodiment depicted, the fabric interface 275 comprises a plurality of fabric access devices (FADs) 280. Cells may be exchanged between the QUIDs 220 and the FADs 280 by handshaking with the SWIP 260. Each FAD 280 muxes the tap buses 235 coupled to the PIDs 220 into the bus 276 coupled to the switch memory 255. According to one embodiment, the FADs 280 each accept a slice of the tap bus width. For example, for a 32-bit tap bus 235 each FAD 280 would accept mutually exclusive 8-bit slices during tap bus cycles. Each FAD 280 may buffer a plurality of cells in either direction (e.g., transmit or receive). Additionally, FADs 280 include a data path 276 and control path 265, for conveying cell data and forwarding control information to the switch memory 255 and SWIP 260, respectively. In one embodiment, the FAD-SWIP and FAD-switch memory interfaces may be implemented as described in copending and pending patent application Ser. No. 09/036,374, entitled "Early Availability of Forwarding Control Information" and assigned to the assignee of the present invention.

Returning to the switch fabric 250, in one embodiment the switch memory 255 is implemented with a 64K×256 pipelined synchronous static random access memory (SRAM). However, it is appreciated that various other types of random access memory (RAM) may be employed to provide for the temporary storage of cells received from the fabric interface 275. Above, it was mentioned that the SWIP 260 controls the movement of cells between the fabric interface 275 and the QUIDs 220 and manages the storage and retrieval of data to and from the switch memory 255. Many different handshaking mechanisms are available for coordinating the exchange of cells between the QUIDs 220 and the FADs 280 and between the FADs 280 and the switch memory 255. For instance, the SWIP 260 may present read and write ready signals and receive read and write enable signals to control the flow of cells. Those of ordinary skill in the art will no doubt recognize various alternative approaches.

It is appreciated that each of the functional units described above may be implemented with hard wired circuitry, Application Specific Integrated Circuits (ASICs), one or more logic circuits, a processor or other components of a programmed computer that perform a series of operations dictated by software or firmware, or a combination thereof. Importantly, the present invention is not limited to a particular implementation of these functional units.

Overview of the Novel Search Approach

Having described an exemplary packet forwarding device, the novel search approach will now briefly be described with reference to FIG. 3. As described above, before a network device can make a forwarding decision relating to a packet, it must locate the most appropriate entry in its forwarding database corresponding to a search key specified in the packet. Locating the appropriate entry typically involves searching a hash bin to which the search key hashes.

Figure 1:
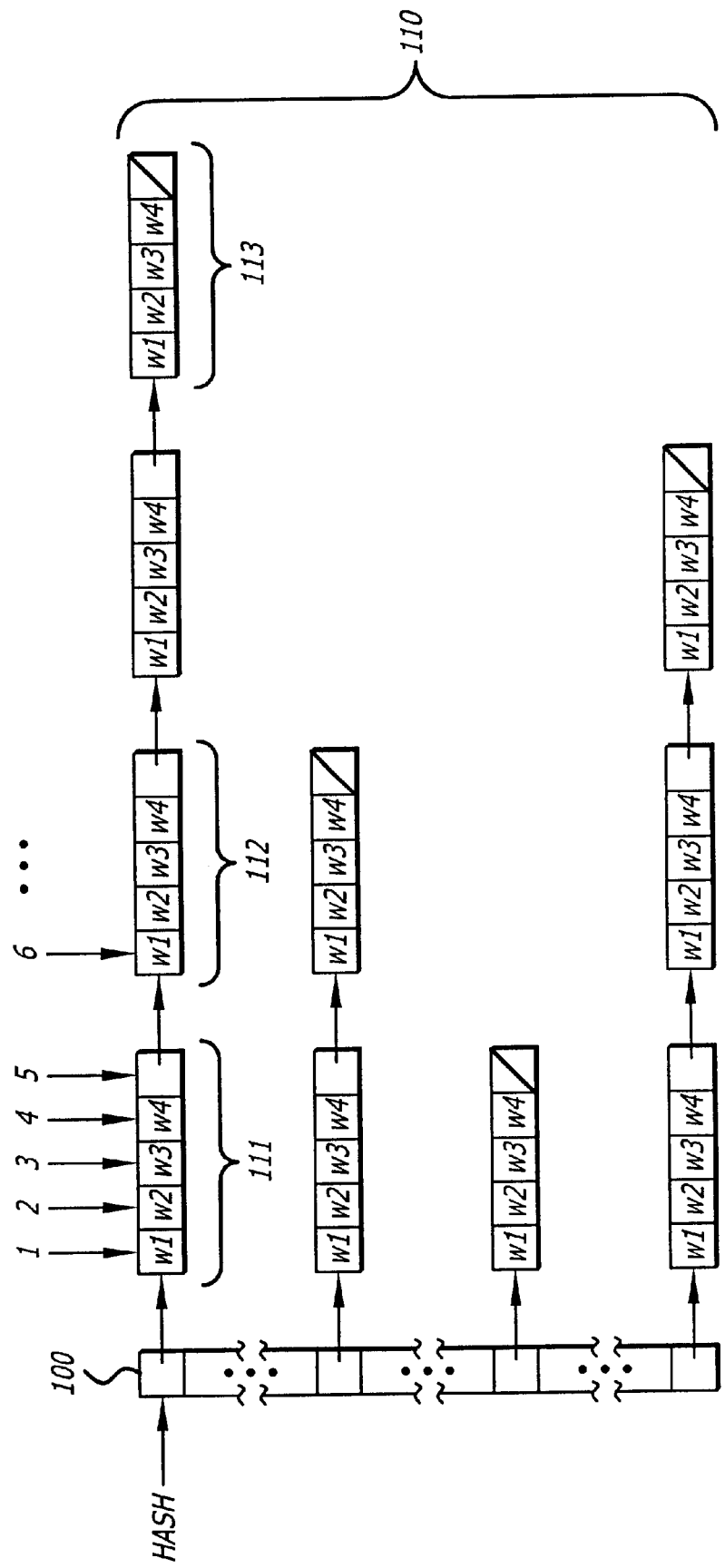
FIG. 1 conceptually illustrates a prior approach for searching a hash bin of a forwarding database.
Figure 3:
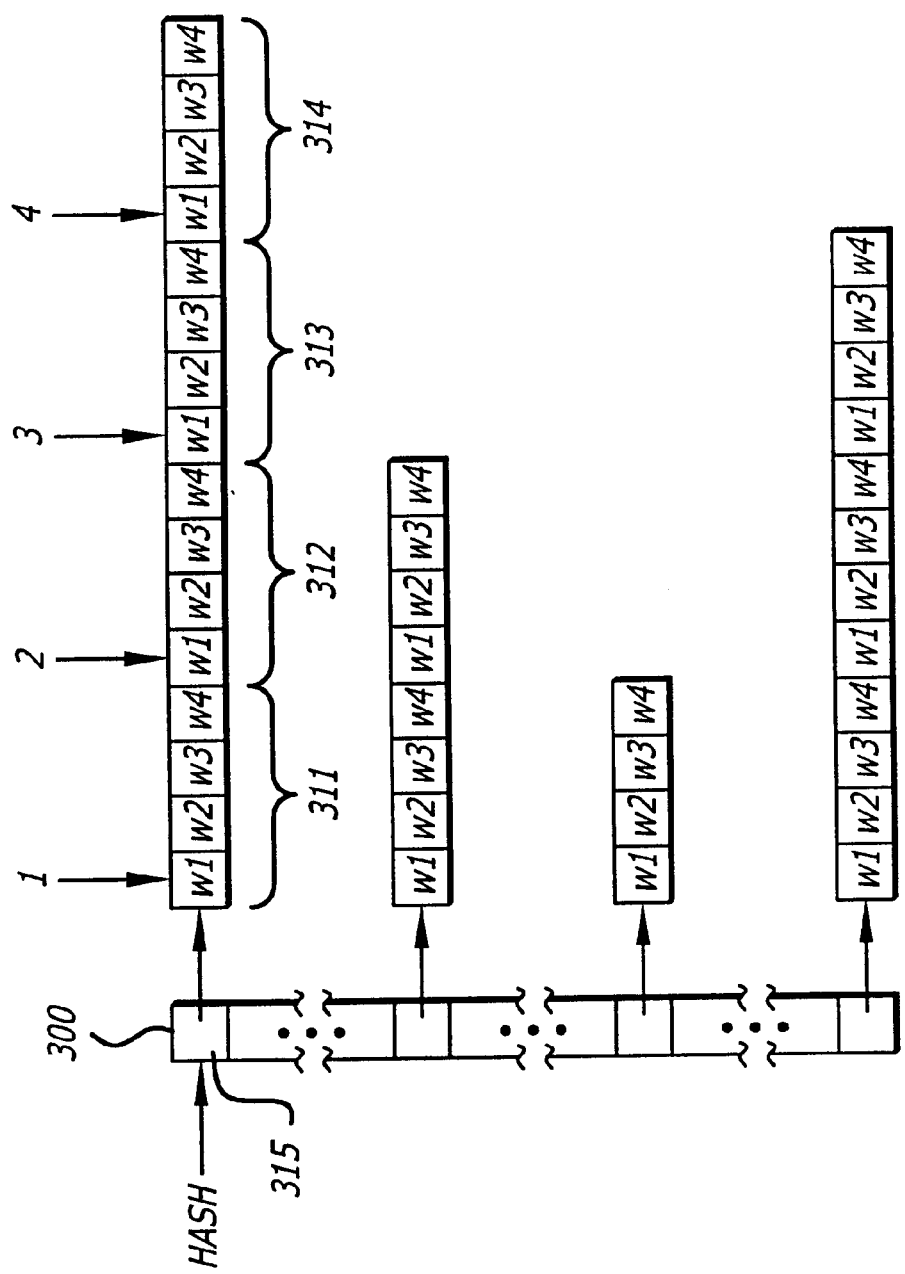
FIG. 3 conceptually illustrates a method of searching a hash bin of a forwarding database according to one embodiment of the present invention.

FIG. 3 illustrates a method of organizing and locating forwarding database entries in a hash table system according to one embodiment of the present invention. In this example, forwarding database entries are associated with bins of a hash table 300 that is stored in a memory, such as a synchronous random access memory (SRAM), in the ARU 230. Hash table 300 includes a bin 315 to which four forwarding database entries 311, 312, 313, and 314 have been hashed. The forwarding database entries in a particular bin are stored contiguously in memory. While this makes entry insertion more challenging, locating the next entry in the bin is more efficient than when a linked data structure, such as that illustrated in FIG. 1, is employed. Using the linked data structure of FIG. 1, after determining entry 111 is not the matching entry, an additional memory accesses is required to retrieve the address of the next entry 112. In contrast, using the compact bin representation depicted in FIG. 3, the location of the first word, w1, of the second entry 312 may quickly be determined by simply adding the forwarding database entry length to the address of the previous entry 311.

Again, the novel search approach is characterized by the fact that it seeks reduce the overall average forwarding database search delay. In one embodiment, this is accomplished by optimizing scenarios that are dealt with inadequately by prior search approaches, e.g., scenarios which include searching a bin that includes multiple entries and the desired entry is not the first entry in the bin. For sake of example, assume entry 314 is the desired entry. A first memory access 1 retrieves the first d-word, w1, of the first entry 311. Before the data corresponding to the first memory access is available, a second memory access request 2 is submitted for the first d-word, w1, of the second entry 312, and so on until the first d-word from entry 311 becomes available. The number of memory access request that may be pending at any given time depends upon the access time of the particular memory employed. At any rate, if the first entry were determined to be the desired entry, then a memory pipeline delay would be incurred and subsequent memory access requests would be generated to retrieve the remainder of entry 311. However, in this example, entry 311 is not the desired entry, so the first d-word of each intervening entry will continue to be retrieved and compared until the match is confirmed at the last entry 314. Forwarding database search processing will be described in more detail below.

Overview of Data Forwarding in a Packet Forwarding Device

Figure 4:
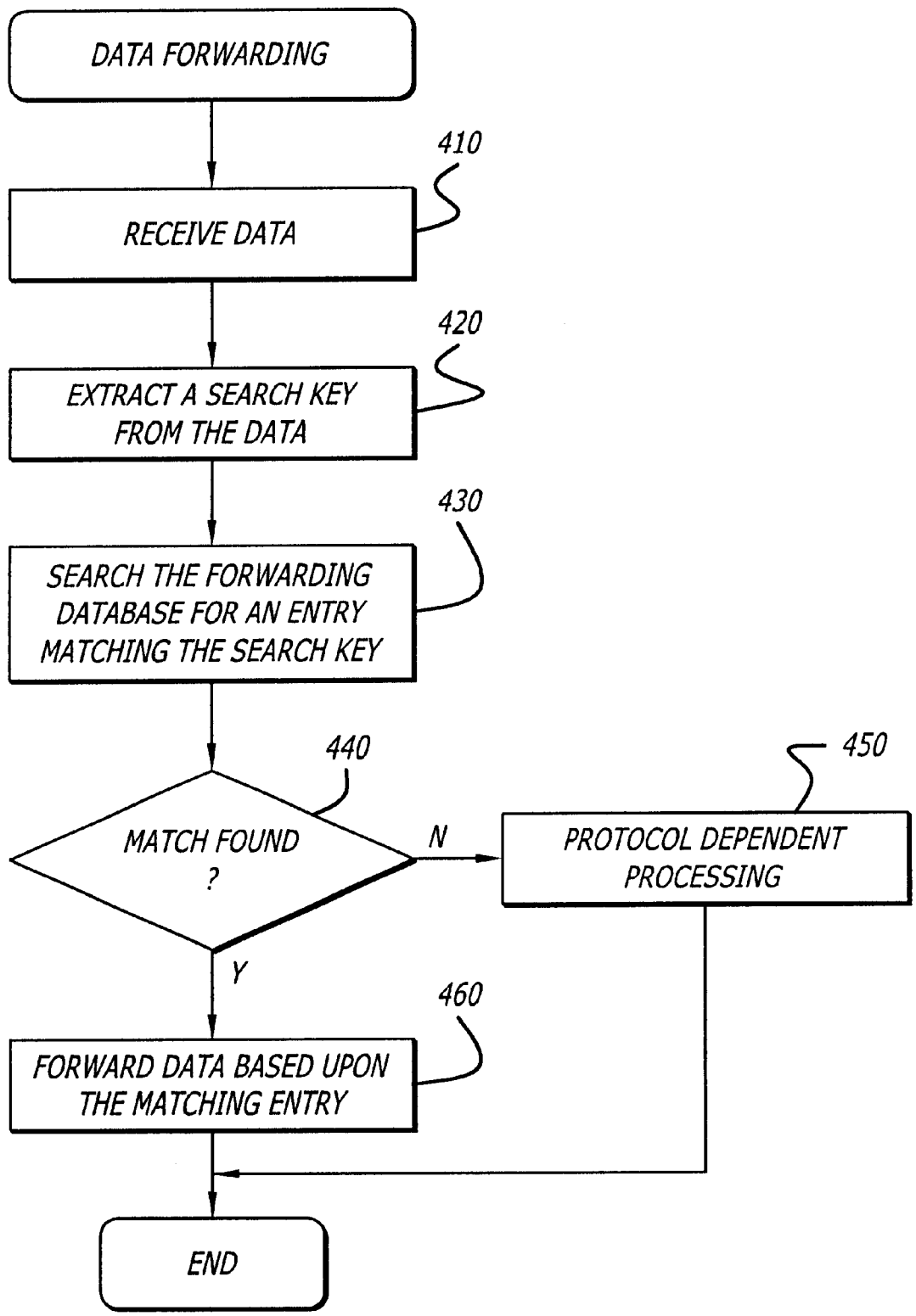
FIG. 4 is a flow diagram illustrating data forwarding processing according to one embodiment of the present invention.

FIG. 4 is a flow diagram illustrating data forwarding processing according to one embodiment of the present invention. At step 410, data is received at one of the I/O interfaces 210. A search key is extracted from the data at step 420. For an Internet Protocol (IP) packet, the search key typically comprises one or more of the following pieces of information that may be embedded in an incoming packet's header: an Institute of Electrical and Electronics Engineers (IEEE) virtual local area network (VLAN) ID, if the incoming packet is IEEE VLAN tagged; a source or destination IP address; or a source or destination media access control (MAC) address. Various other information contained within a packet header may also be employed as the search key. In any event, at step 430, the forwarding database is searched to locate the most appropriate forwarding database entry for the search key. As will be explained further below, the novel search approach employed by embodiments of the present invention limits the worst case search in order to reduce the overall average search time. At step 440, a determination is made if a match was found. If a match was not found for the search key, then various protocol dependent processing may take place at step 450 depending upon the implementation. For example, the data may be forwarded to the CPU for resolution of a default route. Assuming a match was found, at step 460, the data may be forwarded to one or more destinations associated with the matching entry.

Improved Forwarding Database Search

The goal of the improved forwarding database search approach of the present invention is to reduce the overall average search time by attacking those search scenarios that cause prior search approaches to incur multiple memory pipeline delays. In view of this goal, the forwarding database search approach of the present invention performs address generation with the assumption that the former forwarding database entries will not result in a match. Because the address generation is always ahead of the data verification processing, if a database entry other than the last of a bin with multiple entries is ultimately determined to be the desired forwarding database entry, then a memory pipeline delay is incurred. This is so because the memory continues to retrieve data previously requested while the search backs up and begins generating addresses of data in the desired forwarding database entry. However, all told, this approach produces better overall average search times than currently employed optimistic search approaches, that incur memory pipeline delays for each entry encountered in a hash bin that is not the desired forwarding database entry. In the best case search scenario, the prior approach, described with respect to FIG. 1, will incur no memory pipeline delays. However, in a multiple entry bin when the desired entry is the Nth entry, the prior search approach will incur N−1 memory pipeline delays. By contrast, the improved search described herein incurs only a single memory pipeline delay for all cases.

Figure 5:
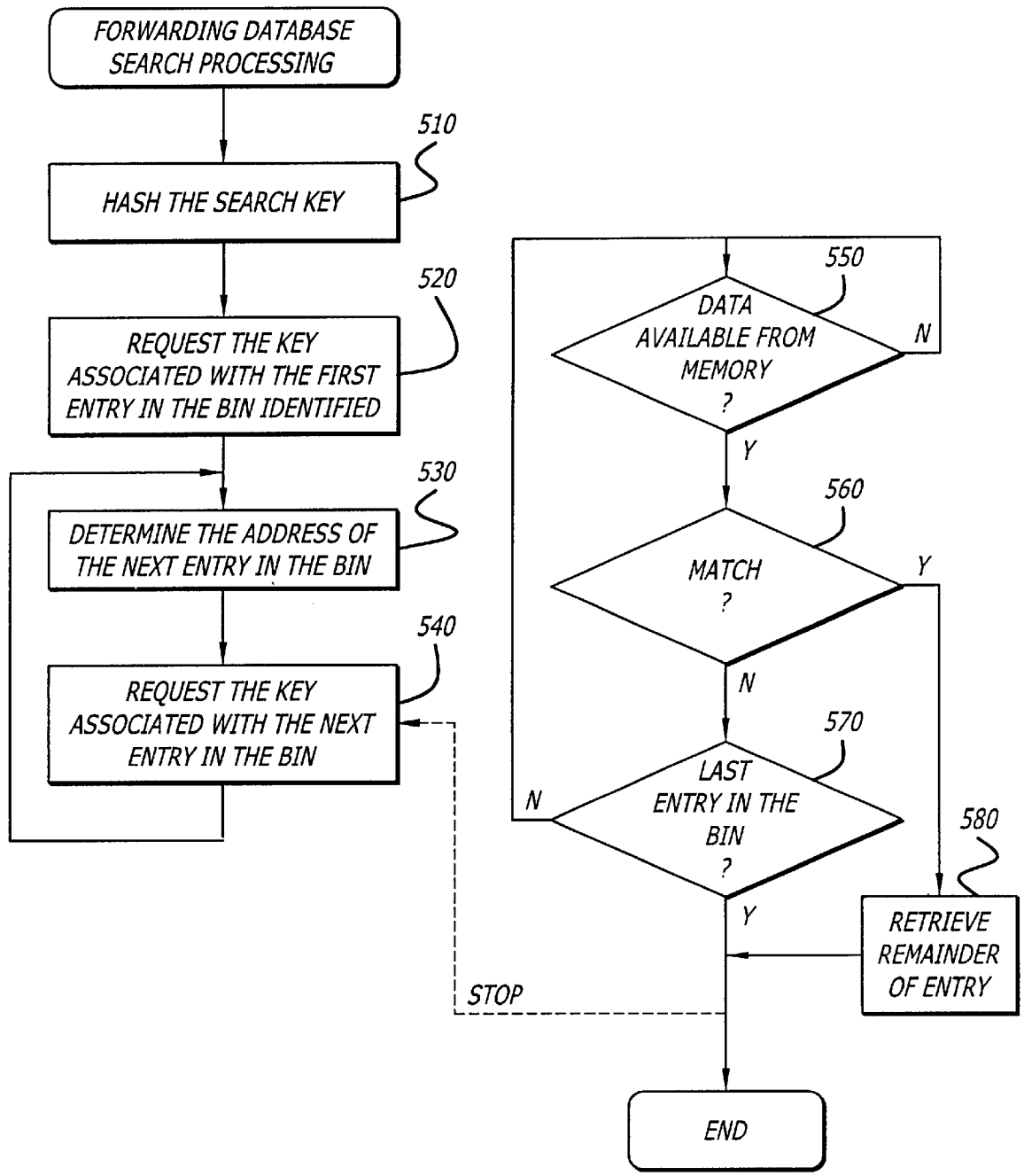
FIG. 5 is a flow diagram illustrating forwarding database search processing according to one embodiment of the present invention.

The improved forwarding database search processing of step 430 will now be described with reference to FIG. 5. The steps may be performed under the control of a programmed processor, such as CPU 290, or the logic may be implemented and distributed among hardware, firmware, software, or a combination thereof within the ARU 230, the I/O interface 210 and/or the QUID 220, for example.

At any rate, in this example, due to the pipelined nature of modem memories, two independent processing threads, (1) an address generation thread and (2) a data verification thread, are depicted. The address generation thread is conceptually represented by steps 510 through 540. A new address may be output to the memory containing the forwarding database on each clock until the end of the bin is reached or the desired forwarding database entry is located. The data verification thread is conceptually represented by steps 550 through 580. While a matching entry has not been found and the end of the bin has not been reached, this thread continues to compare data retrieved from memory to the search key At step 510, a hash function is applied to the search key to produce a hash table index. The hash index identifies the hash bin in which one or more matching forwarding database entries, if any, reside. At step 520, the key associated with the first entry in the hash bin is requested by outputting its address to the memory. The address of the next forwarding database entry is determined at step 530. According to one embodiment, because forwarding database entries are stored in contiguous memory locations, the address of the next entry may be determined simply by adding the entry length to the previously requested address. Thus, the additional memory access required to determine a subsequent entry's address in a linked data structure is avoided. At step 540, the key associated with the next entry in the bin is requested by outputting to the memory the address determined in step 530. The address generation thread continues with step 530.

Turning now to the data verification thread, until a matching entry is found or the end of the hash bin is reached, the search key is compared to the data retrieved from memory. At step 550, it is determined if data requested by the address generation thread is available. If not, the thread waits until data becomes available. When data is available, processing continues with step 560. At step 560, the search key is compared with the key retrieved from the forwarding database entry. If the retrieved key does not match the search key, then processing continues with step 570. Otherwise, if the key matches, then processing continues with step 580. At step 580, the remainder of the matching entry is retrieved from memory and the forwarding database search is complete. At step 570, a determination is made whether the data retrieved corresponds to the last entry in the hash bin. If the last entry in the hash bin has been reached, then no matching entry exists and the search is complete. Otherwise, processing continues with step 550. Once the search has completed, either by reaching the end of the hash bin or by locating the desired forwarding database record, the address generation thread may be stopped as indicated by the dotted line.

Figures 6A, 6B:
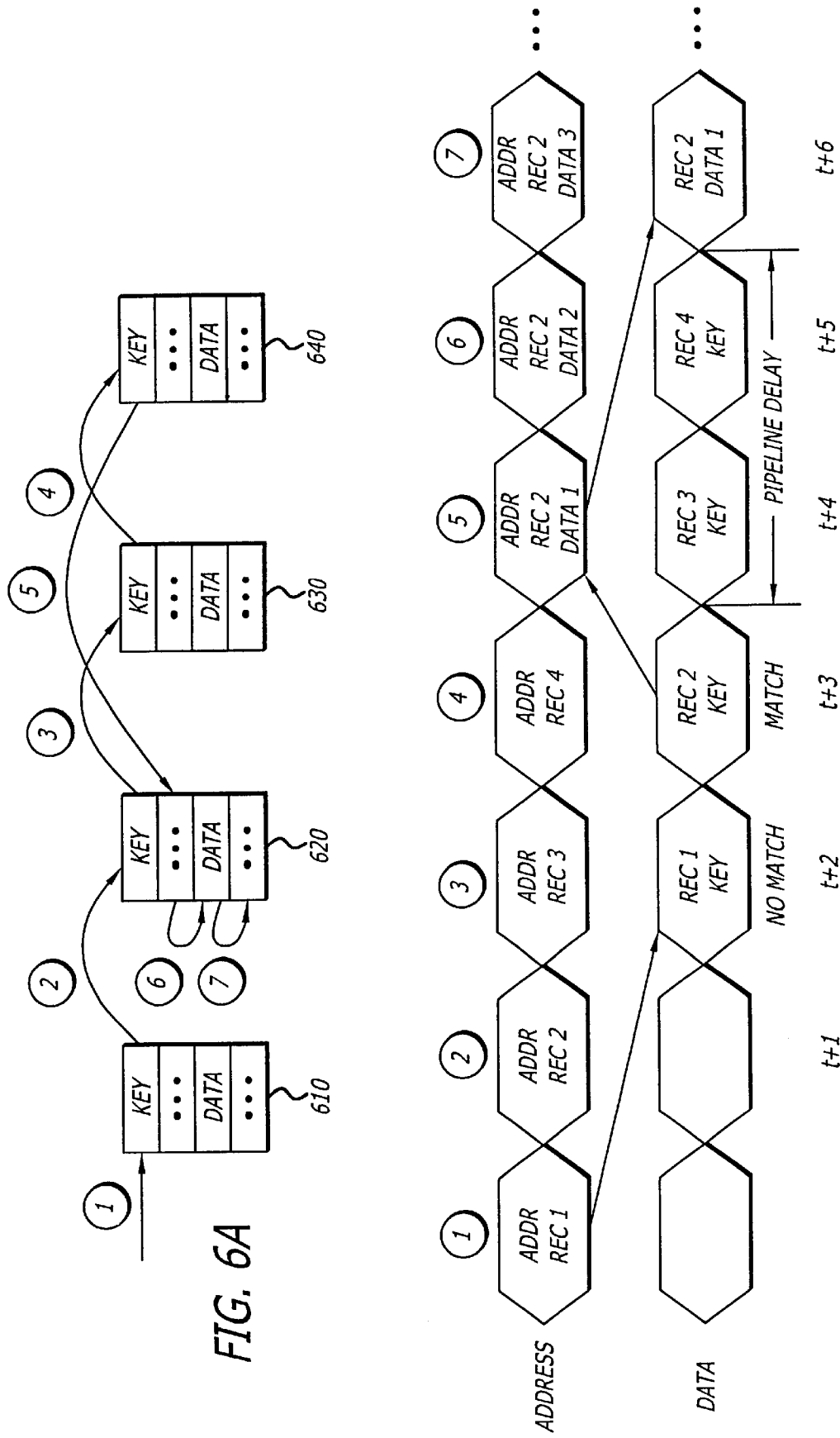
FIG. 6A illustrates an exemplary search sequence through a hash bin of a forwarding database according to one embodiment of the present invention.
FIG. 6B is a timing diagram illustrating the memory access requests and subsequent data availability for a pipelined memory according to one embodiment of the present invention.

FIG. 6A illustrates an exemplary search sequence through a hash bin according to one embodiment of the present invention. In this example, the hash bin includes four forwarding database entries 610, 620, 630, and 640 and entry 620 is the desired entry. The first four memory accesses 1, 2, 3 and 4 essentially skip over the top of the forwarding database entries extracting the key from each one. When it is determined that the key of entry 620 matches the search key, then the subsequent memory accesses 5, 6, and 7 are generated to retrieve the data associated with the matching entry 620.

FIG. 6B is a timing diagram illustrating the memory access requests and subsequent data availability for the exemplary search sequence of FIG. 6A. In this example, a memory access time of two clocks is assumed. In general, from FIG. 6B, it can be seen that the forwarding database search causes addresses to be output to the forwarding database memory on each clock. The first memory access request 1 causes the address of the key of the first forwarding database entry 610 to be output to the memory. The address of the key of the second forwarding database entry 620 is output to the memory when the second memory access request 2 is issued. Two clocks after the first memory access request 1, at time t+2, the requested data becomes available. Subsequent key addresses are generated until the key of forwarding database entry 620 is determined to match at time t+3. In this manner, during consecutive clock cycles, keys of different forwarding database entries are accessed until a match is found. Responsive to the match, at time t+4, the fifth memory access request 5 causes the address of the data associated with the desired entry 620 to be output to the memory. Each subsequent clock, requests are generated so as to retrieve the remainder of the desired entry 620. After a two clock pipeline delay in which data that is no longer necessary becomes available, at time t+6 and each clock thereafter until the whole entry has been loaded from the forwarding database memory, the data requested from the desired entry 620 becomes available.

While, in the simplistic examples above, keys are assumed to be retrieved in one memory access, in practice, a key may span multiple d-words and therefore require multiple memory accesses. When a key spans multiple d-words, it is stored in a manner to maximize the likelihood that the scan of a non-matching record will take only one clock cycle as discussed further below.

Exemplary Forwarding Database Entry Formats

Depending upon the implementation of the ARU 230, a variety of types of forwarding database entries may found in the forwarding database. In one embodiment of the present invention, the forwarding database may include one or more of the following types of entries: (1) MAC address entries; (2) IEEE VLAN ID entries; and (3) IP subnet VLAN entries. A generic forwarding database entry layout is shown in Table 1.

TABLE 1

Generic Forwarding Database Entry Layout

| Address | Bits 31-16 | Bits 15-0 |
| --- | --- | --- |
| N | End of bin indicator; Entry type | Key |
| N + 1 | Entry-specific data | Entry-specific data |
| N + 2 | Entry-specific data | Entry-specific data |
| N + 3 | Entry-specific data | Entry-specific data |

As illustrated above, each forwarding database entry has the same general format including an end of bin indicator, an entry type, a key, and entry-specific data. The end of bin indicator is included in the first d-word of an entry for purposes of terminating a list of entries within the same hash bucket. The entry type field is used to distinguish between different types of entries and communicate to the search processing how to interpret the particular forwarding database entry. The key is used by the search processing to determine if the particular entry is the desired entry by comparing it to the search key. Importantly, to maximize the likelihood that the scan-of a non-matching forwarding database entry will take only one clock cycle, the portion of the key with maximum variability is preferably stored in the first d-word of the entry. In alternative embodiments, forwarding database entries may have formats other than that depicted in Table 1. For example, the location and ordering of the fields may be changed relative to each other, more or less bits may be used for particular fields, and/or more or less address space may be used for the forwarding database entries.

MAC address entries store information for a 48-bit MAC address. MAC address entries may be used to map multicast traffic to an internal multicast group id, for example. Additionally, MAC address entries may define explicit MAC address to VLAN ID associations. As mentioned above, to maximize the likelihood that the scan of a non-matching forwarding database entry will take only one clock cycle, preferably the key, i.e., the MAC address, is stored in the entry such that the 16 bits with maximum variability, e.g., the 4th and 5th bytes of the MAC address (the last two bytes across the wire), are in the first d-word of the entry. IEEE VLAN ID entries may be used to map 16-bit IEEE VLAN IDs to internal multicast group ids. If a packet to be forwarded is IEEE VLAN tagged, looking up the IEEE VLAN ID is the first operation performed by the ARU 230. IP Subnet VLAN entries may be used to assign an IP packet to a VLAN based upon the IP source subnet. Further details regarding the formats of these and other entries that may be employed is not necessary for an understanding of the novel search approach.

Of course, the number and type of forwarding database entry formats will vary from implementation to implementation. Therefore, more or less entry types may be employed in alternative embodiments. The present invention is by no means limited to the entry types described herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of locating an entry in a forwarding database comprising the steps of:
   (A) requesting that a first key associated with a database entry organized into a bin of a hash table be loaded from a memory by outputting, to the memory, an address corresponding to a location in the memory storing the first key;
   (B) in a pipeline manner, requesting that a next key associated with a next database entry be loaded from the memory by outputting, to the memory, an address corresponding to a location in the memory storing the next key;
   (C) after receipt of data from the memory, determining whether the associated database entry is a matching entry by comparing the data to a search key;
   (D) repeating steps (B) and (C) with the next key until a predetermined condition is met.

2. The method of claim 1, wherein the key comprises one or more bytes of a Media Access Control (MAC) address, and wherein the MAC address is stored in the database entry with bits of maximum variability in a first portion of the database entry, whereby the likelihood that the step of determining whether the database entry is a matching entry by comparing the key to a search key will take only a single clock cycle.

3. The method of claim 1, wherein the step of requesting that a next key associated with a next database entry be loaded from the memory further includes determining the address of the next key by adding a database entry length to an address of a previously requested key.

4. The method of claim 1, wherein entries of the forwarding database are organized into bins includes of a hash table, each of the bins including a start and an end, and wherein the predetermined condition comprises the matching entry being found and/or the end of a bin being reached.

5. A method of forwarding data comprising the steps of:
   receiving data at a port;
   extracting a search key from the data;
   searching a forwarding database for an entry that corresponds to the search key by retrieving keys from forwarding database entries, and
   comparing the search key to the keys from the forwarding database entries until a matching forwarding database entry is located,
   wherein the step of retrieving includes causing a pipelined memory in which the forwarding database entries are stored to access keys of different forwarding database entries during consecutive clock cycles; and
   forwarding the data to a destination associated with the matching forwarding database entry.

6. A method of forwarding data comprising the steps of:
   receiving data at a first port of a packet forwarding device;
   extracting a search key from the data;
   searching a forwarding database for an entry that corresponds to the search key by retrieving one or more keys from entries of the forwarding database, and
   comparing the search key to the one or more keys until a matching entry is located,
   wherein the step of retrieving includes causing a pipeline memory in which the forwarding database is stored to access keys of different entries during consecutive clock cycles; and
   forwarding the data to a second port of the packet forwarding device based upon the matching entry.

7. A method of forwarding data comprising the steps of:
   receiving data at a first port of a packet forwarding device;
   extracting a search key from the data;
   searching a forwarding database for an entry that corresponds to the search key by retrieving one or more keys from entries of the forwarding database, and
   comparing the search key to the one or more keys until a matching entry is located,
   wherein the step of retrieving includes causing a pipelined memory in which the forwarding database is stored to access memory locations in an order that minimizes a worst case search of the forwarding database; and
   forwarding the data to a second port of the packet forwarding device based upon the matching entry.

8. The method of claim 7, wherein the order than minimizes the worst case search involves keys of different entries being accessed during consecutive clock cycles.

9. The method of claim 7, wherein the step of extracting a search key from the data comprises the step of extracting one or more of the following from the data:
   a source Internet Protocol (IP) address;
   a destination address;
   a source Media Access Control (MAC) address;
   a destination MAC address; or
   a Virtual Local Area Network (VLAN) tag.

10. A network device comprising:
    a switch fabric; and
    a plurality of input/output (I/O) interface coupled to the switch fabric, each of the plurality of I/O interface comprising
       a plurality of ports, a forwarding and filtering mechanism coupled to the plurality of port, the forwarding and filtering mechanism configured to forward data based upon the results of a search of a forwarding database for an entry corresponding to a search key contained within the data, where:
          one or more keys are retrieved from entries of the forwarding database,
          the search key is compared to the one or more keys until a matching entry is located, and
          during retrieval of the entries, the forwarding and filtering mechanism causes a pipelined memory in which the forwarding database is stored to access memory locations in an order that minimizes a worst search of the forwarding database.

* * * * *

UNITED STATES PATENT AND TRADEMARK OFFICE
CERTIFICATE OF CORRECTION

PATENT NO. : 6,343,289 B1
DATED : January 29, 2002
INVENTOR(S) : Hunter et al.

It is certified that error appears in the above-identified patent and that said Letters Patent is hereby corrected as shown below:

Column 11,
Line 35, after "method of claim 1, wherein", please delete "entries of the forwarding database are organized into bins of a hash table".
Line 37, after "bins" please delete "including" and insert -- includes --.
Line 39, after "being found and/or", please delete "and or" and insert -- or --.
Lines 43 and 60, after "database for an entry", please insert -- organized into a bin of a hash table --

Column 12,
Lines 15 and 49, after "database for an entry", please insert -- organized into a bin of a hash table --

Signed and Sealed this

Sixth Day of April, 2004

JON W. DUDAS
*Acting Director of the United States Patent and Trademark Office*